United States Patent
Spitaler

[19]

[11] Patent Number: 5,883,502
[45] Date of Patent: Mar. 16, 1999

[54] POWER RECTIFIER CIRCUIT

[75] Inventor: Wolfgang Spitaler, Vienna, Austria

[73] Assignee: Siemens Aktiengesellschaft, München, Germany

[21] Appl. No.: 875,231

[22] PCT Filed: Dec. 8, 1995

[86] PCT No.: PCT/EP95/04837

§ 371 Date: Sep. 29, 1997

§ 102(e) Date: Sep. 29, 1997

[87] PCT Pub. No.: WO96/19036

PCT Pub. Date: Jun. 20, 1996

[30] Foreign Application Priority Data

Dec. 12, 1994 [AT] Austria ................................ A 2314/94

[51] Int. Cl.[6] .............................. G05F 1/613; H02M 7/06
[52] U.S. Cl. ......................................... 323/222; 363/126
[58] Field of Search .................................. 323/222, 223; 363/120, 127, 126, 123, 125

[56] References Cited

U.S. PATENT DOCUMENTS

| | | | |
|---|---|---|---|
| 4,215,392 | 7/1980 | Rhoads | 363/49 |
| 4,437,146 | 3/1984 | Carpenter | 363/21 |
| 4,533,986 | 8/1985 | Jones | 363/17 |
| 5,619,404 | 4/1997 | Zak | 363/21 |
| 5,734,562 | 3/1998 | Redl | 363/16 |

*Primary Examiner*—Adolf Deneke Berhane
*Attorney, Agent, or Firm*—Kenyon & Kenyon

[57] ABSTRACT

A mains rectifier circuit for power supply units, in particular for switched-mode power supplies, having a full-wave rectifier (D1 . . . D4) which is connected to the mains voltage and having a smoothing capacitor (CL) which is connected downstream of said full-wave rectifier (D1 . . . D4), the smoothing capacitor being charged at a clock frequency, which is considerably higher than the mains frequency, via the series circuit formed by a boost inductance (LB) and a diode (DS), in the case of which series circuit the junction point between the boost inductance and the diode is connected to earth via a controlled switch (SB), the smoothing capacitor (CL) and the load (SNT) are connected to the full-wave rectifier (D1 . . . D4), an auxiliary rectifier (D1', D2') is provided, from which the series circuit formed by the boost inductance and the diode leads to the smoothing capacitor, and the switch is controlled via a drive circuit (AB) such that additional charging current is supplied to the smoothing capacitor, via the boost inductance, in time periods around the zero crossings of the rectified half-cycles.

6 Claims, 3 Drawing Sheets

POWER RECTIFIER CIRCUIT

FIELD OF THE INVENTION

The present invention relates to a mains rectifier circuit for power supply units, in particular for switched-mode power supplies.

BACKGROUND INFORMATION

Power supply units, in particular switched-mode power supplies for connection to an AC mains, in the simplest case have a rectifier downstream of which an electrolytic capacitor is connected. The charging current profile of the capacitor leads to severe harmonics on the mains and loads said mains with a high apparent power. The mass use of power supply units within the last twenty years has for these reasons already led to serious problems in the power supply grids.

A brief presentation of these problems and various solution proposals, which are intended to lead to a balanced mains load, can be found in the article "Comparison of Standards and Power Supply Design Options for Limiting Harmonic Distortion in Power Systems", by Key and Lai, in "IEEE Transactions on Industry Applications" Vol. 20, No. 4, July/August 1993, pages 688 to 695. One of the circuits which are illustrated there and are also used in practice has a so-called "boost converter". A virtually sinusoidal input current profile can even be achieved using said boost converter, by means of a complex controller. As is noted in the article, however, the relatively high costs and relatively poor reliability, which is governed by additional components, preclude widespread introduction to the market.

SUMMARY OF THE INVENTION

An object of the present invention is to provide a simple and cost-effective solution which leads to a marked reduction in the harmonic content and to an improvement in the power factor.

This object is achieved by a circuit of the type having a full-wave rectifier which is connected to the mains voltage and having a smoothing capacitor which is connected downstream of said full-wave rectifier, the smoothing capacitor being charged at a clock frequency which is considerably higher than the mains frequency, via a series circuit formed by a boost inductance and a diode. The junction point between the boost inductance and the diode is connected to earth via a controlled switch in which, according to the invention, the smoothing capacitor and the load are connected to the full-wave rectifier, an auxiliary rectifier is provided, from which the series circuit formed by the boost inductance and the diode leads to the smoothing capacitor, and the switch is controlled via a drive circuit such that additional charging current is supplied to the smoothing capacitor, via the boost inductance, in time periods around the zero crossings of the rectified half-cycles.

While current peaks occur only in the region of the peak values of the rectified half-cycles in the case of a pure rectifier circuit with a smoothing capacitor—in the normal load case—part of the charging current is shifted, as a result of the invention, using simple means, specifically into those regions around the zero crossings in which no current otherwise flows. In this case, the cost for additional components is absolutely kept within limits. A reduction in the harmonic content of the input current is achieved, as well as an improvement in the efficiency and the power factor.

It is advantageous if an auxiliary capacitor is connected directly downstream of the auxiliary rectifier. The clock frequency of the controlled switch is expediently in the kHz range.

The auxiliary rectifier is advantageously formed by two diodes which are connected as a half-bridge with respect to the full-wave rectifier.

The object is also achieved by a mains rectifier circuit for power supply units, in particular for switched-mode power supplies, having a full-wave rectifier which is connected to the mains voltage and having a smoothing capacitor, the smoothing capacitor being charged at a clock frequency, which is considerably higher than the mains frequency, via the series circuit formed by a boost inductance and a diode, in the case of which series circuit the junction point between the boost inductance and the diode is connected to earth via a first controlled switch, the charging voltage being selected to be higher than the peak value of the mains voltage, in the case of which, according to the invention, the load is connected to the full-wave rectifier, an auxiliary rectifier is provided, from which the series circuit formed by the boost inductance and the diode leads to the smoothing capacitor, and the first switch is controlled via a drive circuit such that charging current is supplied to the smoothing capacitor, via the boost inductance, in time periods around the zero crossings of the rectified half-cycles, and such that a second controlled switch is provided via which the load is connected to the smoothing capacitor and which is controlled via a second drive circuit such that it closes periodically at the rate of twice the mains frequency in a time period around the zero crossings of the rectified half-cycles. The use of the second switch, which is pulsed in synchronism with the mains, results in a further improvement in the input current profile in the sense of a reduced harmonic content.

DETAILED DESCRIPTION

Figure 1:
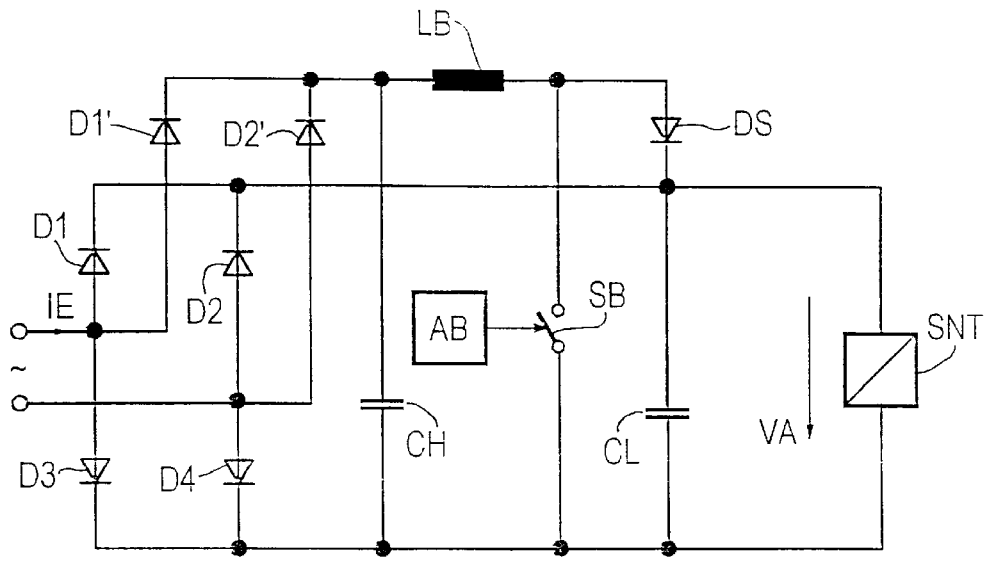
FIG. 1 shows a schematic circuit diagram of a first embodiment of the present invention.

FIG. 1 shows a mains rectifier circuit for a switched-mode power supply SNT which is only indicated here and is also called the "load" in the following text. A full-wave rectifier D1 . . . D4 is connected to the mains voltage UE and is composed of four diodes D1, D2, D3, D4 which are arranged in a bridge circuit. The load, or the switched-mode power supply SNT, as well as a smoothing capacitor CL are connected directly, possibly via a filter or filter element as well, to the output of the full-wave rectifier D1 . . . D4. An auxiliary rectifier, comprising two additional diodes D1', D2' and the diodes D3, D4, is also provided. The output of this auxiliary rectifier is connected to the smoothing capacitor CL via the series circuit formed by a boost inductance LB and a diode DS which is arranged in the forward direction. An auxiliary capacitor CH is also connected directly downstream of the auxiliary rectifier D1', D2'.

The junction point between the boost inductance LB and the diode DS is connected to earth via a controlled switch SB. This switch SB is controlled via a drive circuit AB such that the smoothing capacitor CL is additionally charged, in time periods around the zero crossings of the rectified half-cycles, at a clock frequency which is considerably higher than the mains frequency, the charging voltage being selected to be higher than the peak value of the mains voltage.

The switch SB can be designed, for example, as a field-effect transistor and it is pulsed at a frequency in the kHz range, typically between 20 kHz and 100 kHz, but not, as normal, over the entire half-period but only for a preselected time around the zero crossings. In consequence, the rated power of the series inductor, in this case the boost inductance LB, as well as that of the transistor switch SB and also the power loss of the entire circuit are reduced. The harmonic content of the input current IE can be greatly reduced in comparison with the simple bridge rectifier circuit with smoothing capacitor since a current flow is now also achieved other than at the voltage maxima and the current peaks in the region of the voltage maxima can be correspondingly reduced.

Figure 2A:
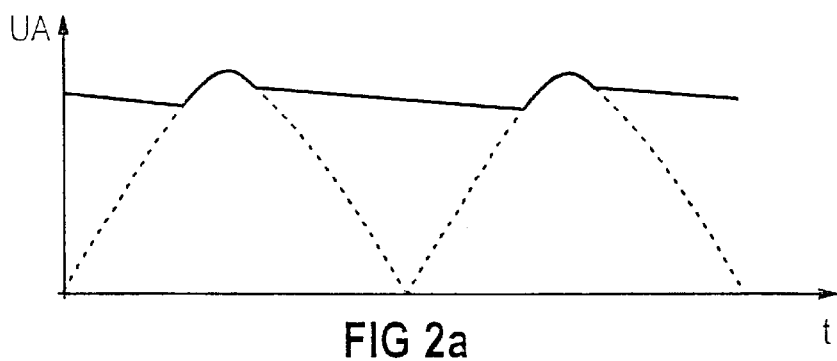
FIGS. 2a and 2b show the time profiles of the output voltage and of the input current, respectively, for the configuration according to FIG. 1.
Figure 2B:
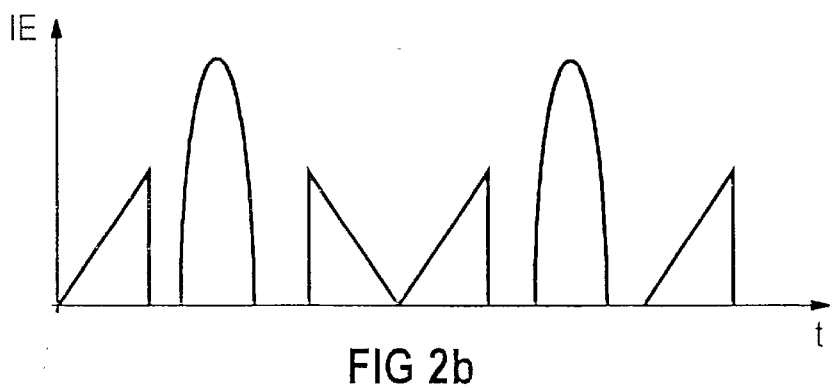

FIG. 2a shows the profile of the output voltage UA for a specific load case, the rectified half-cycles being shown in dashed-dotted form. The associated input current can be seen in FIG. 2b. The current pulses in the region of the voltage maxima (charging current via the rectifier D1 . . . D4) can be seen there, as well as the triangular current pulses around the voltage minima, which are caused by the effect of the boost circuit.

Figure 3:
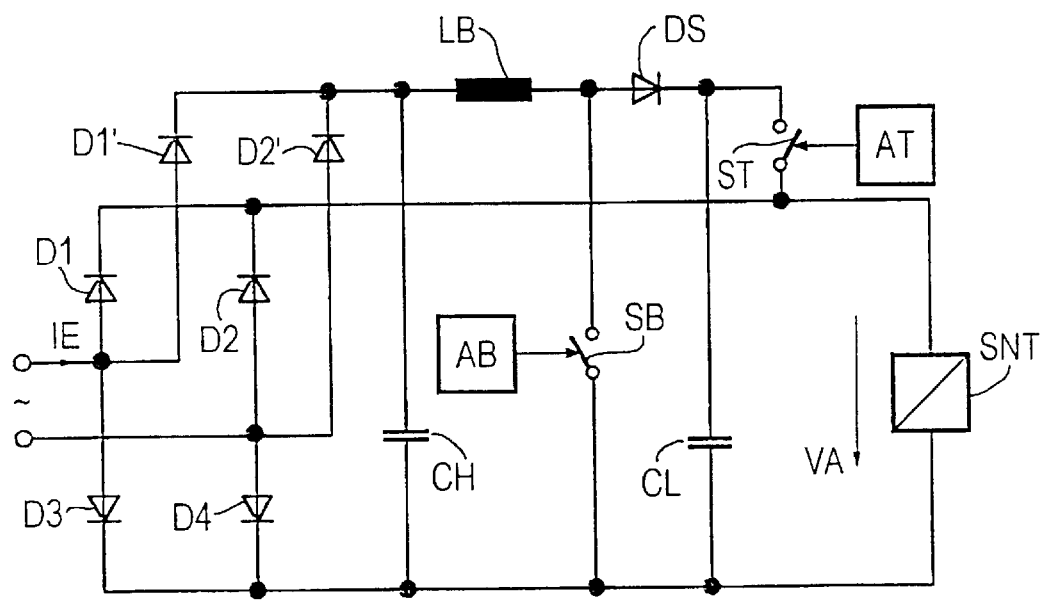
FIG. 3 shows a schematic circuit diagram of a second embodiment of the present invention.

If one is prepared to accept somewhat more cost in order to achieve a further improvement in the mains load, the circuit according to FIG. 3 can be used, which additionally has a second switch which is pulsed in synchronism with the mains.

In the same way as in FIG. 1, the load or the switched-mode power supply SNT is connected directly, possibly via a filter or filter element as well, to the output of the full-wave rectifier D1 . . . D4. The output of the auxiliary rectifier D1', D2' (D3, D4) is connected to the smoothing capacitor CL via the series circuit formed by the boost inductance LB and the diode DES. Once again, an auxiliary capacitor CH is connected directly downstream of the auxiliary rectifier D1', D2' here. The junction point between the boost inductance LB and the diode DS is connected to earth via a first controlled switch SB. This first switch SB is controlled via a first drive circuit AB such that the smoothing capacitor CL is charged, in time periods around the zero crossings of the rectified half-cycles, at a clock frequency which is considerably higher than the mains frequency, the charging voltage being selected to be higher than the peak value of the mains voltage.

The smoothing capacitor CL is connected to the load SNT via a second controlled switch ST which is controlled via a second drive circuit AT such that it closes periodically at the rate of twice the mains frequency in a time period around the zero crossings of the rectified half-cycles. The method of operation of the boost circuit LB-SB-DS has already been explained in conjunction with FIG. 1.

The smoothing capacitor CL is discharged to the load SNT by means of the second controlled switch ST during a selected sub-period of the half-period around the zero crossings of the rectified half-cycles, such that the switch ST closes and opens periodically at the rate of twice the mains frequency, for example +/−45° around the voltage zero crossing, that is to say part of the current flow now additionally occurs before and after the peaks of the normal rectifier circuit.

Figure 4A:
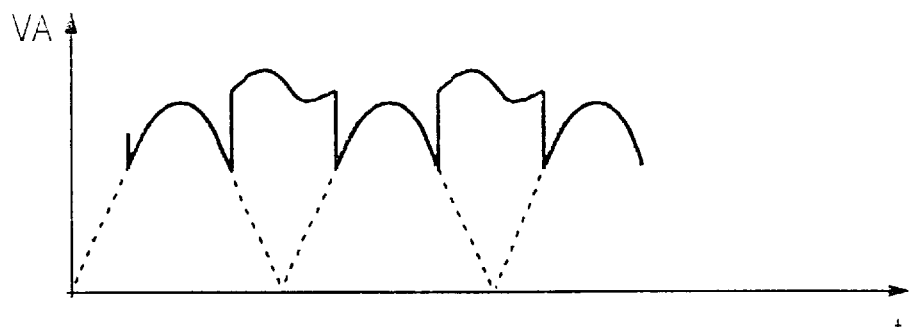
FIGS. 4a, 4b and 4c show the time profiles of the output voltage and of the output current, respectively, in two load cases for the configuration according to FIG. 3.
Figure 4B:
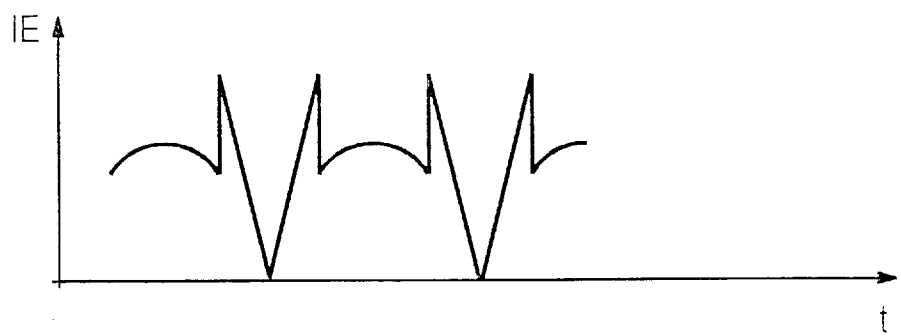
Figure 4C:

The switch ST, which is pulsed at twice the mains frequency, acts in the sense of broadening the current pulses in the region of the voltage maxima. Overall, a current profile is achieved which is distributed well over the period duration, as can be seen from FIG. 4. FIG. 4a shows the profile of the output voltage, and one can clearly see the voltage overshoot at CL in the region of the zero crossings, caused by the step-up converter LB, SB, DS, CL (boost converter). FIGS. 4a and 4b relate to the operating case with "100% rated load" and it can be seen from FIG. 4b that input current always flows—except at the zero crossings. FIG. 4c relates to a load of only 25% of the rated load. In this case, there are time intervals during which no input current flows, but the current overall is lower here.

The circuit according to FIG. 3 thus produces a further improvement with respect to a low harmonic content and the power factor, without any considerable additional cost. The controlled switches SB, ST each have to carry only part of the total switching power since part of the current flow to the load also takes place directly via the rectifier bridge. More cost-effective types can therefore be selected for the power semiconductors, overall.

What is claimed is:

1. A mains rectifier circuit for power supply units, comprising:
   a full-wave rectifier connected to a mains voltage having a main s frequency and directly connected to a load;
   a smoothing capacitor connected downstream of the full-wave rectifier, the smoothing capacitor being charged at a clock frequency, the clock frequency being higher than the mains frequency;
   a series circuit formed by a boost inductance and a diode, a junction point between the boost inductance and the diode being connected to earth via a controlled switch, the smoothing capacitor being charged via the series circuit, the controlled switch being controlled via a drive circuit such that additional charging current is supplied to the smoothing capacitor, via the boost inductance, in time periods around zero crossings of the rectified half-cycles; and
   an auxiliary rectifier coupled to the smoothing capacitor via the series circuit.

2. The mains rectifier circuit of claim 1, wherein an auxiliary capacitor is connected directly downstream of the auxiliary rectifier.

3. The mains rectifier circuit of claim 1, wherein the clock frequency is substantially 1 kHz or greater.

4. The mains rectifier circuit of claim 1, wherein the auxiliary rectifier comprises two diodes which are connected as a half-bridge with respect to the full-wave rectifier.

5. A mains rectifier circuit for power supply units, comprising:
   a full-wave rectifier connected to a mains voltage having a mains frequency and directly connected to a load;
   a smoothing capacitor connected downstream of the full-wave rectifier, the smoothing capacitor being charged at a clock frequency, the clock frequency being higher than the mains frequency;
   a series circuit formed by a boost inductance and a diode, a junction point between the boost inductance and the diode being connected to earth via a first controlled switch, the smoothing capacitor being charged by a charging voltage via the series circuit, the charging voltage being higher than a peak value of the mains voltage, the first controlled switch being controlled via a drive circuit such that additional charging current is supplied to the smoothing capacitor, via the boost inductance, in time periods around zero crossings of the rectified half-cycles;

a second controlled switch connecting the load to the smoothing capacitor and controlled via a second drive circuit such that the second controlled switch closes periodically at a rate of twice the mains frequency in a time period around zero crossings of the rectified half-cycles; and an auxiliary rectifier coupled to the smoothing capacitor via the series circuit.

6. The mains rectifier circuit according to claim 1, wherein the auxiliary rectifier and the series circuit formed by the boost inductance and the diode are arranged in parallel to the full-wave rectifier.

* * * * *

UNITED STATES PATENT AND TRADEMARK OFFICE
CERTIFICATE OF CORRECTION

PATENT NO. : 5,883,502  
DATED : MARCH 16, 1999  
INVENTOR(S) : WOLFGANG SPITALER

Page 1 of 2

It is certified that error appears in the above-indentified patent and that said Letters Patent is hereby corrected as shown below: On the title page: Item [56]

FOREIGN PATENT DOCUMENTS

| DOCUMENT NUMBER | DATE | COUNTRY | CLASS | SUBCLASS | TRANSLATION YES | NO |
|---|---|---|---|---|---|---|
| 96/19037 | 6/1996 | WO | — | — | | |
| 61-173322 | 5/1986 | JP | — | — | Abs. | |
| 2 226 197 | 12/1973 | DE | — | — | Abs. | |
| 42 43 943 | 7/1993 | DE | — | — | Abs. | |
| 42 14 918 | 11/1993 | DE | — | — | Abs. | |
| 195 06 587 | 8/1995 | DE | — | — | Abs. | |

UNITED STATES PATENT AND TRADEMARK OFFICE
CERTIFICATE OF CORRECTION

PATENT NO. : 5,883,502
DATED : March 16, 1999
INVENTOR(S) : Wolfgang Spitaler

It is certified that error appears in the above-identified patent and that said Letters Patent is hereby corrected as shown below:

OTHER DOCUMENTS

| | AUTHOR, TITLE, DATE, PERTINENT PAGES, ETC. |
|---|---|
| | R. Oruganti et al., "A Novel PFC Scheme For AC To DC Converter With Reduced Losses", Proceedings of the International Conference on Industrial Electronic Control and Instrumentation (IECON), Bd. 1 of 3, Sept. 5, 1994, IEEE, pp. 639-645. |
| | D. Tollik et al., "Comparative Analysis of 1-phase Active Power Factor Correction Topologies", Proceedings of the International Telecommunications Energy Conference (INTELEC), Oct. 4-8, 1992, Nr. Conf. 14, Oct. 4, 1992, IEEE, pp. 517-523. |
| | T.S. Key et al., "Comparison of Standards and Power Supply Design Options For Limiting Harmonic Distortion In Power Systems", IEEE Transactions on Industrie Applications, Vol. 20, No. 4, July/Aug. 1993, pp. 688-695. |

Signed and Sealed this

Seventh Day of December, 1999

Attest:

Q. TODD DICKINSON

*Attesting Officer*     *Acting Commissioner of Patents and Trademarks*